United States Patent [19]

Inagaki et al.

[11] Patent Number: 4,860,873
[45] Date of Patent: Aug. 29, 1989

[54] LUBRICATING SYSTEM FOR FRICTION ENGAGING MEANS IN TRANSMISSION

[75] Inventors: Toshiyuki Inagaki; Hiroaki Maeda, both of Aichi, Japan

[73] Assignee: Aisin Seiki Kabushiki Kaisha, Kariya, Japan

[21] Appl. No.: 217,069

[22] Filed: Jul. 7, 1988

Related U.S. Application Data

[63] Continuation of Ser. No. 863,064, May 14, 1986, abandoned.

[30] Foreign Application Priority Data

May 17, 1985 [JP] Japan .................................. 60-103864

[51] Int. Cl.$^4$ ...................... F16D 13/74; F16D 25/11
[52] U.S. Cl. ........................... 192/113 B; 192/70.12; 192/87.13; 192/87.19
[58] Field of Search ............... 192/70.12, 87.13, 87.14, 192/87.18, 87.19, 113 B; 91/46

[56] References Cited

U.S. PATENT DOCUMENTS

| | | |
|---|---|---|
| 2,930,257 | 3/1960 | Christenson ................ 192/113 B X |
| 3,105,582 | 10/1963 | Ziabicki .......................... 192/113 B |
| 3,391,767 | 7/1968 | Stow .......................... 192/113 B X |
| 3,834,503 | 9/1974 | Mauer et al. .................... 192/113 B |
| 4,134,483 | 1/1979 | Horsch ........................... 192/113 B |
| 4,157,750 | 6/1979 | Horsch ........................... 192/113 B |
| 4,557,363 | 12/1985 | Golan ............................. 192/113 B |

FOREIGN PATENT DOCUMENTS

2364366 4/1978 France .......................... 192/113 B

Primary Examiner—Leslie A. Braun
Assistant Examiner—Richard M. Lorence
Attorney, Agent, or Firm—Burns, Doane, Swecker & Mathis

[57] ABSTRACT

A lubricating system for friction engaging apparatus for supplying lubricant to at least one FORWARD friction engaging device and a REVERSE friction engaging device in a power shift transmission, which comprises:

(a) a first lubricating subsystem for supplying the lubricant to the at least one FORWARD friction engaging device;

(b) a second lubricating subsystem for supplying the lubricant to the REVERSE friction engaging device; and (c) a hydraulic system for alternatively selecting either one of said first and second lubricating subsystems in response to a friction engaging apparatus pressure produced at each selected power transmission shift position and for decreasing the quantity of lubricant supplied to at least one disengaged friction engaging apparatus.

The friction engaging means comprises clutch(es) and brake(s). Excess lubrication to clutches and brakes and resultant slip torque thereof are reduced.

31 Claims, 2 Drawing Sheets

LUBRICATING SYSTEM FOR FRICTION ENGAGING MEANS IN TRANSMISSION

This application is a continuation of application Ser. No. 863,064, filed May 14, 1986 now abandoned.

BACKGROUND OF THE INVENTION

1. Field of the Invention

The present invention relates to a lubricating system for friction engaging means in a power shift transmission and more specifically to a lubricating system for clutches and/or brakes therein.

2. Background of the Invention

An example of friction engaging means (clutch) lubricating systems of this kind is disclosed in Japanese Utility Model Kokai Publication No. 53-15478, in which a working fluid drained from a torque converter turbine is cooled through a cooling unit, pressure-regulated through a check valve, and then supplied to all the friction engaging means (clutches, etc.) incorporated in a power shift transmission.

3. Discussion of the Prior Art

In the above conventional lubricating system for friction engaging means, however, since the lubricant is simply supplied to all the friction engaging means without adjusting the quantity of the lubricant to be supplied to each friction engaging means according to each transmission shift position, it has been necessary to always supply the maximum necessary quantity of lubricant to each friction engaging means, thus resulting in problems in that an oil pump of a large capacity should be provided for securely supplying the maximum necessary quantity of lubricant, or else there arises a serious accident such as clutch seizing.

Suppose a transmission with each one speed range of FORWARD and REVERSE. Here, if the above-mentioned maximum necessary quantity of lubricant is secured, even when the transmission is shifted to NEUTRAL, for instance, there will not occur such a problem that a vehicle is started at NEUTRAL shift position by a slip torque under the condition that the quantity of lubricant supplied to the FORWARD clutch (i.e., clutch taking part in establishing FORWARD) is the same as that supplied to the REVERSE clutch (i.e., clutch taking part in establishing REVERSE). However, there still exists a problem in that, when the vehicle is driven in the forward or rearward direction, the transmission efficiency is lowered due to an increase in the slip torque caused by the other disengaged friction engaging means (clutch or brake).

Further, in the case of a transmission with two FORWARD ranges and one REVERSE range, if the same quantity of lubricant is supplied to the three friction engaging means, there exists a problem such that a slip torque is produced in the forward direction at the NEUTRAL position and the transmission efficiency is lowered due to the slip phenomenon in each transmission shift position.

SUMMARY OF THE INVENTION

With these problems in mind, therefore, it is a primary object of the present invention to provide a lubricating system for friction engaging means in a transmission in which the torque loss caused by slip phenomenon can be reduced as much as possible by controlling the quantity of lubricant supplied to the disengaged friction engaging means according to each transmission shift position. This is because it is necessary to still supply a small quantity of lubricant to the disengaged friction engaging means.

Other objects of the invention will become apparent in the entire disclosure.

To achieve the above-mentioned object, in the lubricating system according to the present invention, the lubricating system is divided into at least two subsystems comprising a first subsystem for at least one FORWARD friction engaging means and a second subsystem for a REVERSE friction engaging means; and either one of the subsystems is alternatively selected in response to a clutch pressure generated at each selected transmission shift position in order to decrease the quantity of lubricant supplied to disengaged friction engaging means by a hydraulic system. Typically, the FORWARD friction engaging means includes at least a clutch and the REVERSE friction engaging means includes a clutch. However, other friction engaging means such as brakes may be used in lieu of clutches or additionally thereto depending upon the type of transmissions.

Also, the lubricating system can be so constructed that the quantity of lubricant supplied to the engaged friction engaging means is increased as the pressure of the friction engaging means increases.

Further, in the case of a transmission having more FORWARD friction engaging means than the REVERSE friction engaging means in number, it is possible to prevent the vehicle from being started at its NEUTRAL position by constructing the hydraulic system in such a way that a large quantity of lubricant can be supplied to the subsystem for the REVERSE friction engaging means at the NEUTRAL position. (Note, here, the second FORWARD friction engaging means may be a brake.)

In the case of a transmission having the same number of FORWARD and REVERSE friction engaging means, it is possible to prevent the vehicle from being started at its NEUTRAL position by reducing the quantity of lubricant supplied to all the friction engaging means. Typically, friction engaging means for both FORWARD and REVERSE are clutches.

In the lubricating system according to the present invention, operation is such that when the transmission is shifted to a FORWARD or REVERSE position, the hydraulic system decreases the quantity of lubricant supplied to the disengaged friction engaging means (e.g., clutch) on the basis of the friction engaging means (e.g., clutch) pressure generated at this selected transmission shift position.

Therefore, it is possible to reduce the slip torque caused by the disengaged friction engaging means (e.g., clutch), thus resulting in an increase in the transmission efficiency. Further, in the case of the transmission having two FORWARD positions and one REVERSE position, the quantity of lubricant supplied to the two FORWARD friction engaging means (e.g., clutches, or clutch and brake) is limited at its NEUTRAL position and a larger quantity of lubricant is supplied to the REVERSE friction engaging means (e.g., clutch) thus it is possible to prevent the vehicle from being started at in NEUTRAL position. Furthermore, since similarly the lubricating system arrangement can be applied to the transmission having one FORWARD and REVERSE position, it is also possible to reduce the slip torque and therefore to prevent the vehicle from being started (creeping) at the NEUTRAL position.

BRIEF DESCRIPTION OF THE DRAWINGS

The features and advantages of the friction engaging means lubricating system according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

The embodiments of the present invention will be described hereinbelow with reference to the attached drawings.

Figure 1:
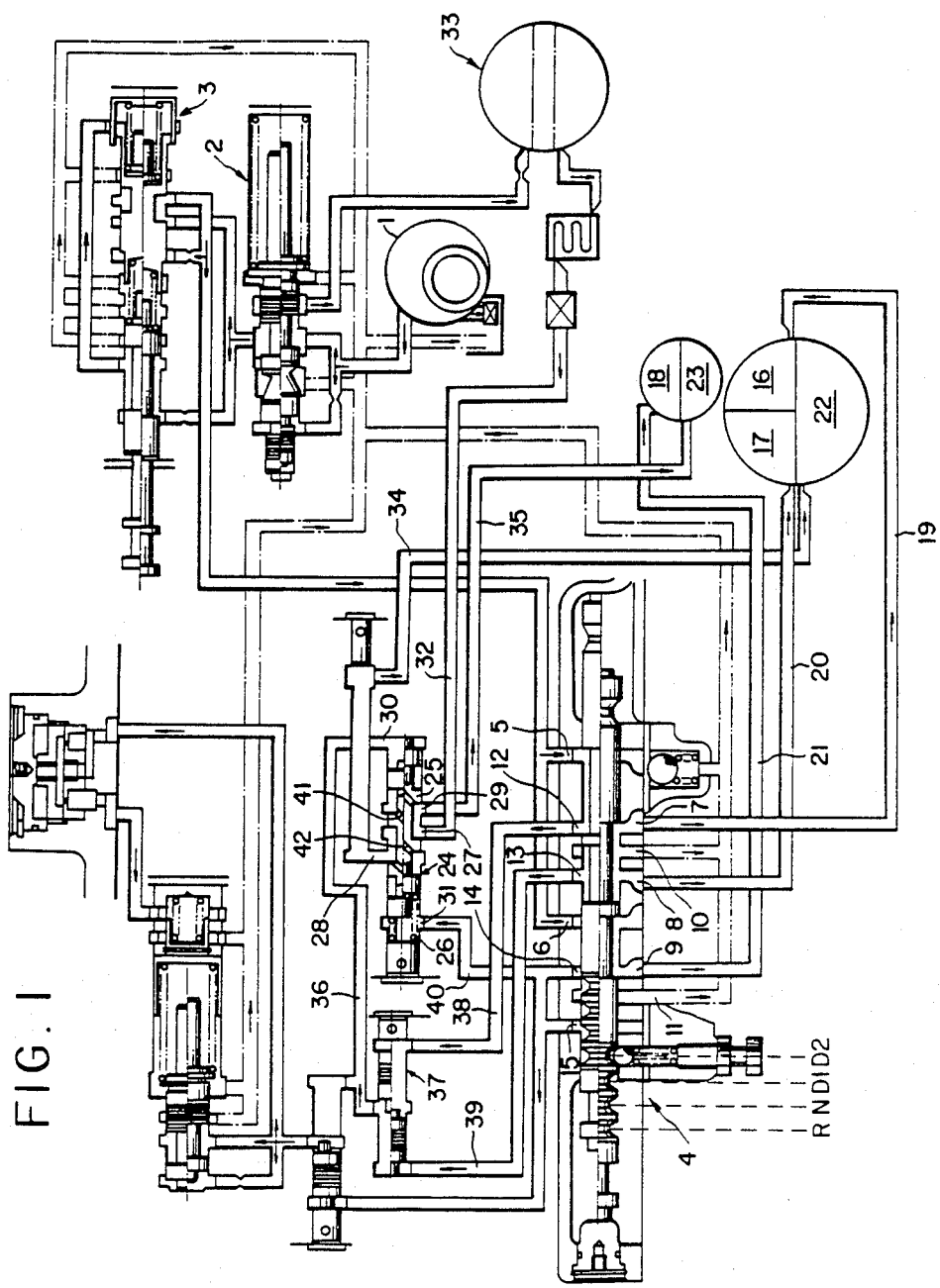
FIG. 1 is a piping diagram showing an embodiment of the friction engaging means lubricating system according to the present invention.
Figure 2:
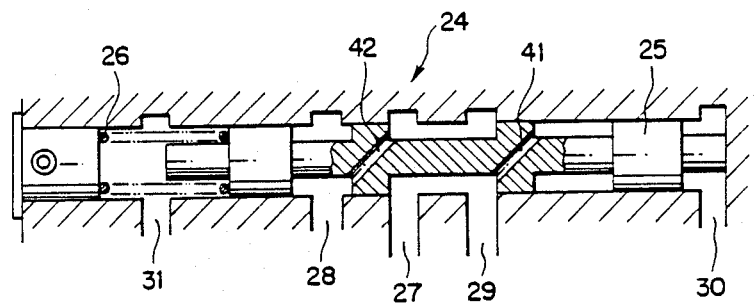
FIG. 2 is an enlarged schematic cross-sectional view, partly in side elevation of a control valve incorporated in the lubricating system shown in FIG. 1.

FIG. 1 shows a friction engaging means lubricating system of the present invention and FIG. 2 shows a control valve incorporated in the hydraulic system thereof. In FIG. 1, the transmission includes three clutches (as friction engaging means) consisting of two FORWARD clutches to establish two FORWARD shift ranges and a REVERSE clutch to establish one REVERSE shift range, and working oil drained from a torque converter is used as the clutch lubricating fluid.

The oil whose pressure is raised by an oil pump 1 is regulated in pressure through a regulator valve 2 and then supplied to two inlet ports 5 and 6 of a selector valve 4 through an inching valve 3. This selector valve 4 is so constructed as to be selectable to four transmission shift positions corresponding to two FORWARD ranges (HIGH/LOW DRIVEs), and REVERSE and NEUTRAL ranges. The selector valve 4 is provided with plural outlet ports communicating with each clutch engagement piston corresponding to the four transmission shift positions, that is, a first outlet port 7 opened when the transmission is shifted to HIGH DRIVE, a second outlet port 8 opened when shifted to LOW DRIVE, a third outlet port 9 opened when shifted to REVERSE and two fourth outlet (drain) ports 10 and 11 opened to drain oil when shifted to NEUTRAL (i.e., an all-clutch disengagement position). In addition, the selector valve 4 is provided with four additional outlet ports for controlling a control valve as shown in FIG. 2 according to the four shift positions, that is, a fifth outlet port 12 communicating with the first outlet port 7 and opened when the transmission is shifted to HIGH DRIVE, a sixth outlet port 13 communicating with the second outlet port 8 and opened when shifted to LOW DRIVE, a seventh outlet port 14 communicating with the third outlet port 9 and opened when shifted to REVERSE, and an eighth outlet (drain) port 15 communicating with the fourth outlet port 10 and opened to drain oil when shifted to NEUTRAL whereat pressure should be released according to the shift position.

The transmission friction engaging means comprise a HIGH DRIVE clutch 16, a LOW DRIVE clutch 17, and a REVERSE clutch 18. The HIGH DRIVE clutch 16 communicates with the first outlet port 7 of the selector valve 4 through a line 19, the LOW DRIVE clutch 17 communicates with the second outlet port 8 through the line 20, and the REVERSE clutch 18 communicates with the third outlet port 9 through the line 21, respectively.

The clutch lubrication passage is divided into two passages 22 and 23, i.e., one for the HIGH and LOW clutches 16 and 17 and the other for the REVERSE clutch 18, and is selectively controlled by the control valve 24 as shown in FIG. 2 so that the quantity of oil supplied to the disengaged clutche(s) can be reduced.

In FIG. 2, this control valve 24 is composed of a spool 25 and a spring 26 for urging the spool 25, and provided with an inlet port 27, two outlet ports 28 and 29, and two control ports 30 and 31 each communicating with one of end chambers of the control valve. The inlet port 27 communicates with a torque converter 33 through a line 32 to which oil is supplied through the regulator valve 2. The first outlet port 28 communicates with the DRIVE side lubricant passage 22 through a line 34, and the second outlet port 29 communicates with the REVERSE side lubricant passage 23 through a line 35, respectively. The first control port 30 communicates with a shuttle valve 37 through a line 36 and then with the fifth and sixth outlet ports 12 and 13 of the selector valve 4 through two lines 38 and 39, so that pressure of the two DRIVE clutches 16 and 17 is applied to this control port 30 through the lines 19-38 and 20-39. The second control port 31 assigned to a chamber having the spring 26 communicates with the seventh outlet port 14 of the selector valve 4 through a line 40, so that pressure of the REVERSE clutch 18 is applied to this control port 31 through the lines 21-40.

In this control valve 24, when clutch pressure is applied to one control port, the other control port communicating with the disengaged clutch lubricant passage is closed automatically. However, in order to apply the minimum quantity of lubricant to the disengaged clutches, two orifices 41 and 42 are formed in the spool 25 so as to communicate the port 27 with the two outlet ports 28 and 29, respectively, as depicted in FIG. 2. These two orifices 41 and 42 are not necessarily formed in the spool 25, and can be formed between the line 32 communicating with the inlet port 27 and the two lines 34 and 35 communicating with the two outlet ports 28 and 29.

The operation of the above-mentioned friction engaging means (clutch) lubricating system will be described hereinbelow.

(1) When the selector valve 4 is shifted to HIGH DRIVE:

The inlet port 5 of the selector valve 4 communicates with the first outlet port 7 to supply a line pressure to the HIGH DRIVE clutch 16 through the line 19. At the same time, the LOW DRIVE clutch 17 and the REVERSE clutch 18 communicate with the fourth drain ports 10 and 11 through the lines 20 and 21 to release the pressure in the LOW DRIVE clutch 17 and the REVERSE clutch 18. Further, the inlet port 5 of the selector valve 4 communicates with the fifth outlet port 12 of the selector valve 4, so that the line pressure is applied to the shuttle valve 37 through the line 38 to urge the valve 37 in the leftward direction. As a result, the line pressure reaches the first control port 30 of the control valve 24 through the line 36. Further, the line 40 communicating with the second control port 31 of the control valve 24 and the line 39 communicating with the shuttle valve 37 communicate with the fourth drain port 11 of the selector valve 4. Therefore, the spool 25 of the control valve 24 is moved in the leftward direction by the line pressure to communicate the inlet port 27 with the outlet port 28 in the control valve 24 and simultaneously to close the outlet port 29 thereof. Therefore, drained oil is supplied from the torque converter 33 through the line 32 and the inlet port 27 to the outlet port 28 and further to the DRIVE lubricant passage 22 through the line 34 as lubricant for two DRIVE clutches 16 and 17. On the other hand, lubricant whose quantity is limited through the orifice 41 is supplied to the REVERSE clutch lubricant passage 23 through the line 35.

(2) When the selector valve 4 is shifted to LOW DRIVE:

The inlet port 6 of the selector valve 4 communicates with the second outlet port 8 thereof, so that the line pressure is supplied to the LOW DRIVE clutch 17 through the line 20. At the same time, the HIGH DRIVE clutch 16 and the REVERSE clutch 18 communicate with the fourth and eighth drain ports 10 and 15 through the lines 19 and 21, respectively to release the pressure in the HIGH DRIVE clutch 16 and the REVERSE clutch 18. Further, the inlet port 6 of the selector valve 4 communicates with the sixth outlet port 13 of the selector valve 4, so that the line pressure is applied to the shuttle valve 37 through the line 39 to move the valve 37 in the rightward direction. As a result, the line pressure reaches the first control port 30 of the control valve 24 through the line 36. Further, the line 40 communicating with the second control port 31 communicates with the eighth drain port 15 of the selector valve 4, and the line 38 communicating with the shuttle valve 37 communicates with the fourth drain port 10. Since the spool 25 of the control valve 24 is moved in the leftward direction by the line pressure in the same way as in the HIGH DRIVE shift position, the quantity of lubricant distributed to the lubricant passages 22 and 23 is the same as in the HIGH DRIVE shift position.

(3) When the selector valve 4 is shifted to NEUTRAL:

The two inlet ports 5 and 6 of the selector valve 4 are closed, and all the outlet ports 7, 8, 9, 12, 13 and 14 communicate with the drain ports 10, 11 and 15. The spool 25 of the control valve 24 moves in the rightward direction by the spring 26 to communicate the inlet port 27 with the outlet port 29. Therefore, lubricant is supplied to the lubricant passage 23 of the REVERSE clutch 18 through the line 35. On the other hand, lubricant whose quantity is limited through the orifice 42 is supplied to the lubricant passage 22 of the DRIVE clutches 16 and 17. In the case where two DRIVE clutches for two FORWARD ranges are present, the quantity of lubricant supplied to the DRIVE lubricant passage 22 is limited so as to balance with that of the REVERSE lubricant passage 23. Therefore, it is possible to prevent the vehicle from being started when the transmission is shifted to the NEUTRAL position.

(4) When the selector valve 4 is shifted to REVERSE:

The input port 6 of the selector valve 4 communicates with the third outlet port 9, and the line pressure is supplied to the REVERSE clutch 18 through the line 21. Simultaneously, the two DRIVE clutches 16 and 17 are communicated with the fourth drain port 10 through the lines 19 and 20 to drain the pressure of the clutches 16 and 17. Further, the inlet port 6 communicates with the seventh outlet port 14 of the selector valve 4, and the line pressure reaches the second control port 31 of the control valve 24 through the line 40. On the other hand, the line 36 communicating with the first control port 30 communicates with the fourth drain port 10. Therefore, the spool 25 is moved in the rightward direction by the line pressure as in the NEUTRAL position, so that the quantity of lubricant distributed to the lubricant passages 22 and 23 is the same as that in the NEUTRAL position.

Figure 3:
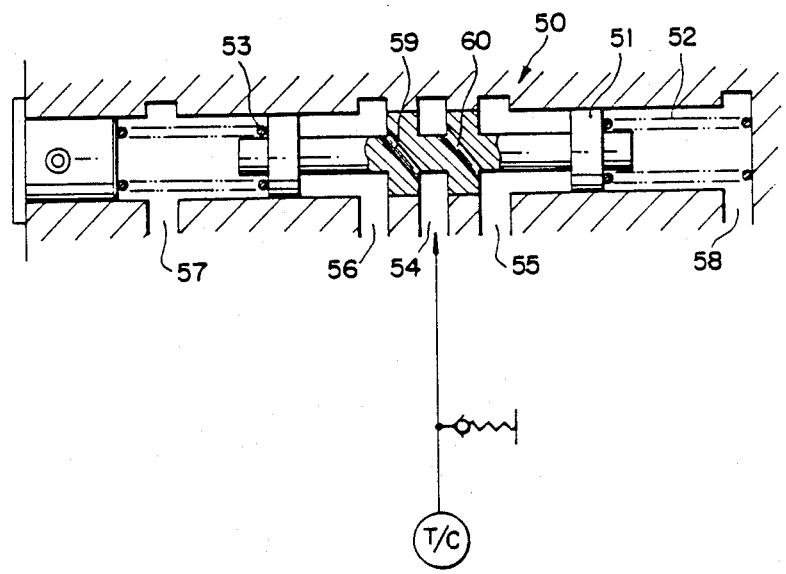
FIG. 3 is an enlarged schematic cross-sectional view, partly in side elevation of another similar control valve incorporated in the lubricating system shown in FIG. 1.

FIG. 3 shows another control valve for the clutch lubricant piping system according to the present invention used when a power shift transmission has single-range FORWARD (DRIVE) and REVERSE positions. The function of this control valve 50 shown in FIG. 3 is basically equivalent to that shown in FIG. 2.

The control valve 50 is composed of a spool 51 and two springs 52 and 53 for urging the spool 51 from opposite sides, and formed with an inlet port 54, two outlet ports 55 and 56 and two control ports 57 and 58 communicating with both end chambers formed at both the sides of the spool 51. Further, the spool 51 is provided with two orifices 59 and 60 communicating the inlet port 54 with the two outlet ports 55 and 56, respectively.

When one of the outlet ports 55 and 56 is closed, the lubricant whose quantity is limited through one of the orifices 59 and 60 is supplied through one of the outlet ports 55 and 56. Further, at the NEUTRAL position in which no clutch lubricant pressure is introduced into both the control ports 57 and 58, the lubricant whose quantity is limited through the two orifices 59 and 60 is supplied to both the DRIVE and REVERSE clutches.

In the above embodiments, the friction engaging means are disclosed as clutches. However, brakes may be used as at least a part of such friction engaging means, for instance the second FORWARD clutch (HIGH DRIVE clutch 16) may be a brake in some type of transmission. The present invention may be applied where three or more FORWARD friction engaging means are present in the transmission for establishing three or more speed ranges.

Usually the REVERSE range is limited to one speed range. However, this does not necessarily mean that the present invention is limited thereto.

It should be noted that modifications may be done without departing from the gist of the present invention as disclosed herein and claimed hereinbelow.

What is claimed is:

1. A lubricating system for friction engaging means for supplying lubricant to a plurality of forward friction engaging means and a reverse friction engaging means in a power shift transmission having a plurality of shift ranges, which comprises:

(a) a first lubricating subsystem for supplying the lubricant to the plurality of forward friction engaging means;

(b) a second lubricating subsystem for supplying the lubricant to the reverse friction engaging means;

(c) a select valve having a plurality of positions including at least one forward position for alternatively supplying a friction engaging means pressure to one of said forward friction engaging means and draining a friction engaging means pressure from said reverse friction engaging means, a reverse position for alternatively supplying friction engaging means pressure to said reverse friction engaging means and draining a friction engaging means pressure from said forward friction engaging means and a neutral position for alternatively draining friction engaging means pressure from said reverse friction engaging means and said forward friction engaging means, said friction engaging means pressure being supplied from a friction engaging means pressure source; and (d) a control valve connected with said select valve for controlling communication of a lubricant source with the first and second lubricating subsystems, said control valve supplying more quantity of lubricant to the first lubricant subsystem than the second lubricant subsystem at said at least one forward position of the select valve, and said control valve supplying more quantity of lubricant to the second lubricating subsystem than the first lubricating subsystem at said neutral position and at said reverse position of the select valve.

2. The lubricating system as set forth in claim 1, wherein said control valve increases the quantity of lubricant supplied to an engaged friction engaging means in response to the friction engaging means pressure.

3. The lubricating system as set forth in claim 1, wherein said control valve decreases the quantity of the lubricant supplied to the forward friction engaging means when the power transmission is shifted to the neutral position.

4. The lubricating system as set forth in claim 1, wherein the friction engaging means comprise at least one clutch and brake.

5. The lubricating system as set forth in claim 4, wherein the friction engaging means includes a forward clutch and a reverse clutch.

6. The lubricating system as set forth in claim 1, wherein the forward friction engaging means include two clutches.

7. The lubricating system as set forth in claim 1, wherein said control valve includes a spool and a first chamber acting on the spool, the first chamber receiving a hydraulic pressure signal responsive to pressure of the forward friction engaging means.

8. The lubricating system as set forth in claim 7, wherein said control valve further comprises a second chamber acting on the spool opposing against the first chamber, the second chamber receiving a pressure in response to the reverse friction engaging means pressure.

9. The lubricating system as set forth in claim 1, wherein said control valve further comprises orifices for communicating the lubricant source to the first and second subsystems to allow a minimum amount of lubricant flow even at an otherwise discommunicated state thereof.

10. The lubricating system as set forth in claim 9, wherein the select valve at the neutral position supplies the control valve with a pressure signal equivalent to that supplied at the reverse position.

11. The lubricating system as set forth in claim 1, wherein the first subsystem permits lubrication of at least two friction engaging means for establishing at least two forward speed ranges.

12. The lubricating system as set forth in claim 11, wherein the communication with the first subsystem is established via a shuttle valve which alternatively receives any of the pressures of said two friction engaging means and delivers an output pressure in response to said friction engaging means pressure.

13. The lubricating system as set forth in claim 1, wherein the select valve simultaneously delivers a control pressure for controlling said control valve.

14. The lubricating system as set forth in claim 13, wherein at the neutral position of the select valve the control valve reduces the amount of lubricant to the forward friction engaging means.

15. The lubricating system as set forth in claim 14, wherein the control valve at the neutral position allows only a minimum amount of flow of lubricant to the forward friction engaging means.

16. The lubricating system as set forth in claim 1, wherein the friction engaging means comprises at least one clutch.

17. The lubricating system as set forth in claim 1, wherein the friction engaging means comprises at least one brake.

18. The lubricating system as set forth in claim 1, wherein the friction engaging means comprises a plurality of clutches and brakes.

19. The lubricating system set forth in claim 1, wherein the forward friction engaging means includes a clutch and a brake.

20. A lubricating system for friction engaging means for supplying lubricant to a forward friction engaging means and a reverse friction engaging means in a power shift transmission having a plurality of shift ranges, which comprises:

(a) a first lubricating subsystem for supplying the lubricant to the forward friction engaging means;

(b) a second lubricating subsystem for supplying the lubricant to the reverse friction engaging means;

(c) a select valve having a plurality of positions including a forward position for alternatively supplying a friction engaging means pressure to said forward friction engaging means and draining a friction engaging means pressure from said reverse friction engaging means, a reverse position for alternatively supplying friction engaging means pressure to said reverse friction engaging means and draining a friction engaging means pressure from said forward friction engaging means, and a neutral position for alternatively draining friction engaging means pressure from said reverse friction engaging means and said forward friction engaging means, said friction engaging means pressure being supplied from a friction engaging means pressure source; and (d) a control valve connected with said select valve for controlling communication of a lubricant source with the first and second lubricating subsystems, said control valve supplying less quantity of lubricant to the first lubricant subsystem than the second lubricant subsystem at the reverse position of the select valve; said control valve supplying less quantity of lubricant to the second lubricant subsystem than the first lubricant subsystem at the forward position of the select valve; and said control valve supplying a same quantity of lubricant to the first and second lubricating subsystems at the neutral position of the select valve.

21. The lubricating system as set forth in claim 20, wherein said control valve increases the quantity of lubricant supplied to an engaged friction engaging means in response to the friction engaging means pressure.

22. The lubricating system as set forth in claim 20, wherein said control valve decreases the quantity of the lubricant supplied to the friction engaging means when the power transmission is shifted to the neutral position.

23. The lubricating system as set forth in claim 20, wherein the friction engaging means comprise at least one clutch and brake.

24. The lubricating system as set forth in claim 20, wherein said control valve includes a spool and a first chamber acting on the spool, the first chamber receiving a hydraulic pressure signal responsive to pressure of the forward friction engaging means.

25. The lubricating system as set forth in claim 24, wherein said control valve further comprises a second chamber acting, on the spool opposing against the first chamber, the second chamber receiving a pressure in response to the reverse friction engaging means pressure.

26. The lubricating system as set forth in claim 20, wherein the friction engaging means comprises at least one clutch.

27. The lubricating system as set forth in claim 20, wherein the friction engaging means comprises at least one brake.

28. The lubricating system as set forth in claim 20, wherein the friction engaging means comprises a plurality of clutches and brakes.

29. The lubricating system as set forth in claim 20, wherein said control valve further comprises orifices for communicating the lubricant source to the first and second subsystems to allow a minimum amount of lubricant flow even at an otherwise discommunicated state thereof.

30. The lubricating system as set forth in claim 20, wherein the select valve simultaneously delivers a control pressure for controlling said control valve.

31. The lubricating system as set forth in claim 20, wherein at the neutral position of the select valve, the control valve reduces the amount of lubricant to all the friction engaging means.

* * * * *